United States Patent [19]

Ratafia et al.

[11] 4,146,563
[45] Mar. 27, 1979

[54] METHOD AND APPARATUS FOR FORMING THERMOPLASTIC FOAMS

[75] Inventors: Manuel S. Ratafia; Kyung W. Suh, both of Granville, Ohio

[73] Assignee: The Dow Chemical Company, Midland, Mich.

[21] Appl. No.: 862,264

[22] Filed: Dec. 20, 1977

[51] Int. Cl.² ............................................. B29D 27/00
[52] U.S. Cl. ........................................ 264/51; 264/555; 425/376 R; 425/817 C
[58] Field of Search ................... 264/46.1, 51, 88, 95, 264/93; 425/376 R, 817 C

[56] References Cited

U.S. PATENT DOCUMENTS

| 3,193,406 | 7/1965  | Mittelman .................... 264/88 X |
| 3,335,207 | 8/1967  | Richie ........................ 264/88 X |
| 3,812,230 | 5/1974  | Takahashi .................... 264/95 X |
| 3,835,209 | 9/1974  | Karabedian ................... 264/95 X |
| 3,887,693 | 6/1975  | Sato et al. ................... 264/95 X |
| 3,922,328 | 11/1975 | Johnson ....................... 264/46.1 |
| 3,954,929 | 5/1976  | Hoenke ........................ 264/46.1 X |
| 3,966,381 | 6/1976  | Suh ............................. 425/376 |
| 4,049,760 | 9/1977  | Lozach ........................ 264/88 X |

FOREIGN PATENT DOCUMENTS 192960 3/1964 Sweden ........................................ 264/88

*Primary Examiner*—Philip Anderson
*Attorney, Agent, or Firm*—Tai-Sam Choo

[57] ABSTRACT

An improved method and apparatus for the preparation of a thermoplastic foam having an enlarged cross-sectional area of a given geometric configuration. A heat-plastified foamable gel of a thermoplastic resin containing a blowing agent is extruded through an orifice of a die into a shaping channel. As the gel expands into a foam generally filling the channel and advances in the longitudinal direction, the foam is supported on a cushion of gas in the area of the channel, relatively near the die orifice, where the surface of the foam is sticky. A sufficient restraining force is applied to the foam in the area, where the foam surface is generally non-sticky, to exert a force in the direction opposite to the normal longitudinal advancement of the foam thereby forcing the foam to expand to a cross-sectional area greater than that of a foam allowed to expand freely. The expanded foam is then cooled to a generally self-supporting condition.

19 Claims, 3 Drawing Figures

METHOD AND APPARATUS FOR FORMING THERMOPLASTIC FOAMS

BACKGROUND OF THE INVENTION

This invention relates to method and apparatus for forming thermoplastic foams. More particularly, it relates to an improved method of forming thermoplastic foams having enlarged cross-sectional areas, i.e., greater than those of the foams allowed to foam freely, and a new apparatus used in connection with such method.

Foams of thermoplastic resins such as, for example, polystyrene and polyethylene, are useful industrial products because of their excellent heat-insulating, cushioning and other properties. These foams have found acceptance over the years in such applications as thermal insulation and cushioning as well as raw material for the fabrication of various shaped articles. The preparation of thermoplastic foams by extruding a heat-plastified mixture of a thermoplastic resin and a blowing agent is well known in the art and is described in U.S. Pat. Nos. 2,740,157; 3,067,147; 3,413,387; 3,413,388; 3,431,163; 3,431,164; 3,954,929 and 3,966,381 and Canadian Pat. No. 451,864.

In many end use applications, it is desirable to obtain thermoplastic foams having large cross-sectional areas. In order to obtain such foams, it has been necessary to use dies having relatively large extrusion orifices with corresponding increases in extrusion output capacities. Such practice requires frequent die changes which are expensive and time consuming. Furthermore, it has also been necessary to inventory a large number of dies having different dimensions of extrusion orifice with the attendant increase in the cost of equipment and storage space.

It is especially desirable to obtain thermoplastic foams having relatively large cross-sectional areas of generally rectangular cross-sectional configurations. In order to obtain such foams, several methods have been used. In one of such methods, a thermoplastic foam having a cross-sectional configuration closely approximating the configuration of a rectangle is extruded and subsequently shaped into a rectangular configuration by trimming off the edges thereof. Such trimming results in a waste of material, equipment and labor. Sometimes, it is necessary to adhesively laminate several layers of relatively thin thermoplastic foams together to realize the desired thickness for a given foam. Such a step requires an additional operating step involving costly equipment and further labor input. In order to overcome these disadvantages, several approaches have been suggested. U.S. Pat. No. 3,966,381, for example, teaches a method of directly extruding thermoplastic foams having generally rectangular cross-sectional configurations: A heat-plastified foamable gel is extruded through an elongate slit-like extrusion orifice into a region defined by a pair of spaced apart, generally parallel shaping plates, lying generally parallel to and symmetrical about the plane of the axis of extrusion and the major axis of the die opening, and a pair of generally concave restraining means (edge restraining means) positioned adjacent to the ends of the die, and the gel is cooled to a self-supporting foam. The restraining means constrain the freshly-extruded gel in generally convex configuration in the plane of the axis of extrusion and the major axis of the die opening at a location adjacent to the die. The restraining means having a generally concave surface in a plane perpendicular to the axis of extrusion engages edges of the gel and applies friction thereto to provide the resulting thermoplastic foam with a generally rectangular cross-sectional configuration. All surfaces which contact the freshly-extruded foam are coated with polytetrafluoroethylene to prevent sticking of the foam thereto. However, recent attempts to make a polyethylene foam, in accordance with the teachings of U.S. Patent No. 3,966,381, have resulted in repeated failures. More specifically, the foam tears because of high friction between the surfaces thereof and those of the polytetrafluoroethylene coating on the metallic shaping plates. Even with foams having relatively low friction, such as, for example, foams of polystyrene, the skin quality thereof needs further improvement. Furthermore, the curved restraining means is generally time consuming and expensive to make.

This invention provides an improved method of forming thermoplastic foams having enlarged cross-sectional areas of various geometric configurations and a new apparatus in connection with such method. More particularly, the invention provides thermoplastic foams having cross-sectional areas significantly greater than those obtained without any aid of forming, i.e., free foaming, and having generally rectangular cross-sectional configurations. The thermoplastic foams produced in accordance with this invention generally have improved skin quality and improved compressive strength in the vertical direction. In one aspect, this invention also provides thermoplastic foams generally having more straight rectangular edges thereon which are obtained using a relatively inexpensive edge restraining means.

SUMMARY OF THE INVENTION

These benefits and other advantages of the present invention are achieved by an improvement in a method for the preparation of a thermoplastic foam plank having a cross-sectional area of a given geometric configuration, in a continuous manner, wherein the foam passes through from a heated sticky state to cooled non-sticky state during the preparation. The steps of such method comprises preparing a heat-plastified foamable gel, extruding the gel through an orifice of a die into a shaping channel of lower pressure at least partially defined by at least one forming member, the channel having an internal cross-sectional configuration generally corresponding to the shape of the foam desired, the foamable gel expanding into a foam generally filling the channel and advancing in the longitudinal direction toward the discharge end remote from the orifice of the die, and cooling the foam to a generally self-supporting condition. The improvement in accordance with the present invention comprises supporting the gel on a cushion of gas, formed by introducing a gas stream between the surface of the gel and the opposing surface of the forming member, at least in the area of the channel, relatively near the orifice of the die, where the surface of the foam is sticky. The improvement also comprises applying a sufficient restraining force to the foam in the area, relatively remote from the die orifice, where the foam surface is generally non-sticky, to exert a force in the direction opposite to the normal longitudinal advancement of the foam thereby forcing the foam in the space generally between the orifice of the die and the area where the restraining force is applied to expand to a cross-sectional area greater than that of a foam allowed to expand freely.

A specific embodiment of this invention provides an improvement in a method for the preparation of a thermoplastic foam having a cross-sectional area of generally rectangular geometric configuration, in a continuous manner, wherein the foam passes through from a heated sticky state to cooled non-sticky state during the preparation. The steps of such method comprises preparing a heat-plastified foamable gel, extruding the gel through an elongate orifice of a die, which orifice has a major axis and a minor axis, into a channel of lower pressure defined by a pair of spaced apart, generally parallel, planar forming members, lying generally parallel to and one on each side of a plane defined by the major axis of the orifice and the axis of extrusion and a pair of edge restraining means positioned generally adjacent to ends of the orifice of the die, the foamable gel expanding into a foam generally filling the channel and advancing in the longitudinal direction toward the discharge end remote from the orifice of the die, and cooling the foam to a generally self-supporting condition. The restraining means can be placed anywhere along the major axis of the die opening, and can partially close the same. The improvement comprises supporting the gel on a cushion of gas, formed by introducing a gas stream between the surface of the gel and the opposing surfaces of the forming members and those of the edge restraining means, at least in the area of the channel, relatively near the die orifice, where the surface of the foam is sticky. The improvement also comprises applying a sufficient restraining force to the foam in the area, relatively remote from the die orifice, where the foam surface is generally non-sticky, to exert a force in the direction opposite to the normal longitudinal advancement of the foam thereby forcing the foam in the space generally between the orifice of the die and the area where the restraining force is applied to expand to a cross-sectional area greater than that of a foam allowed to expand freely.

Also contemplated within the scope of the present invention is an improvement in an apparatus for the preparation of a thermoplastic foam article by extrusion which comprises in cooperative combination a source of heat-plastified foamable gel of a thermoplastic resin containing a blowing agent, the source having a source discharge end, a die having a receiving end, a die discharge end, a passageway between the die ends terminating in an extrusion orifice at the die discharge end. The orifice has an axis of extrusion, and the receiving end of the die is in operative combination with the discharge end of the source. The apparatus also comprises a supporting and shaping means having a first end and a second end, the first end being in operative combination with said die and adapted to receive foamable gel from said extrusion orifice. The supporting and shaping means is adapted to receive foamable gel from the extrusion orifice thereby shaping at least a major portion of the cross-sectional configuration of a thermoplastic article being prepared. The improvement is the supporting and shaping means comprising at least one forming member defining at least one plenum therein, a gas supply means defining a gas supply passage, the gas supply passage in operative communication with said plenum. The forming member has at least one wall portion, said wall portion defining generally opposed shaping surface portions disposed on opposite sides of the axis of extrusion. The wall portion has a generally porous region of generally uniform porosity at least at a location adjacent to said die. The forming member in the porous region defines passage means for a gas between the plenum and the foam article being prepared. The surface portions define a space therebetween and the space bounded by the surface portions, the surface portions being disposed at least about a major portion of the perimeter of the cross-sectional configuration of the space. The cross-sectional configuration of the space is in a plane which is generally perpendicular to the axis of extrusion.

As herein defined, the term "sticky" means the foam will not withstand frictional contact with a solid surface.

BRIEF DESCRIPTION OF THE DRAWINGS

One aspect of the invention is further illustrated by reference to the accompanying drawings, in which.

DETAILED DESCRIPTION AND EMBODIMENTS

Figure 1:
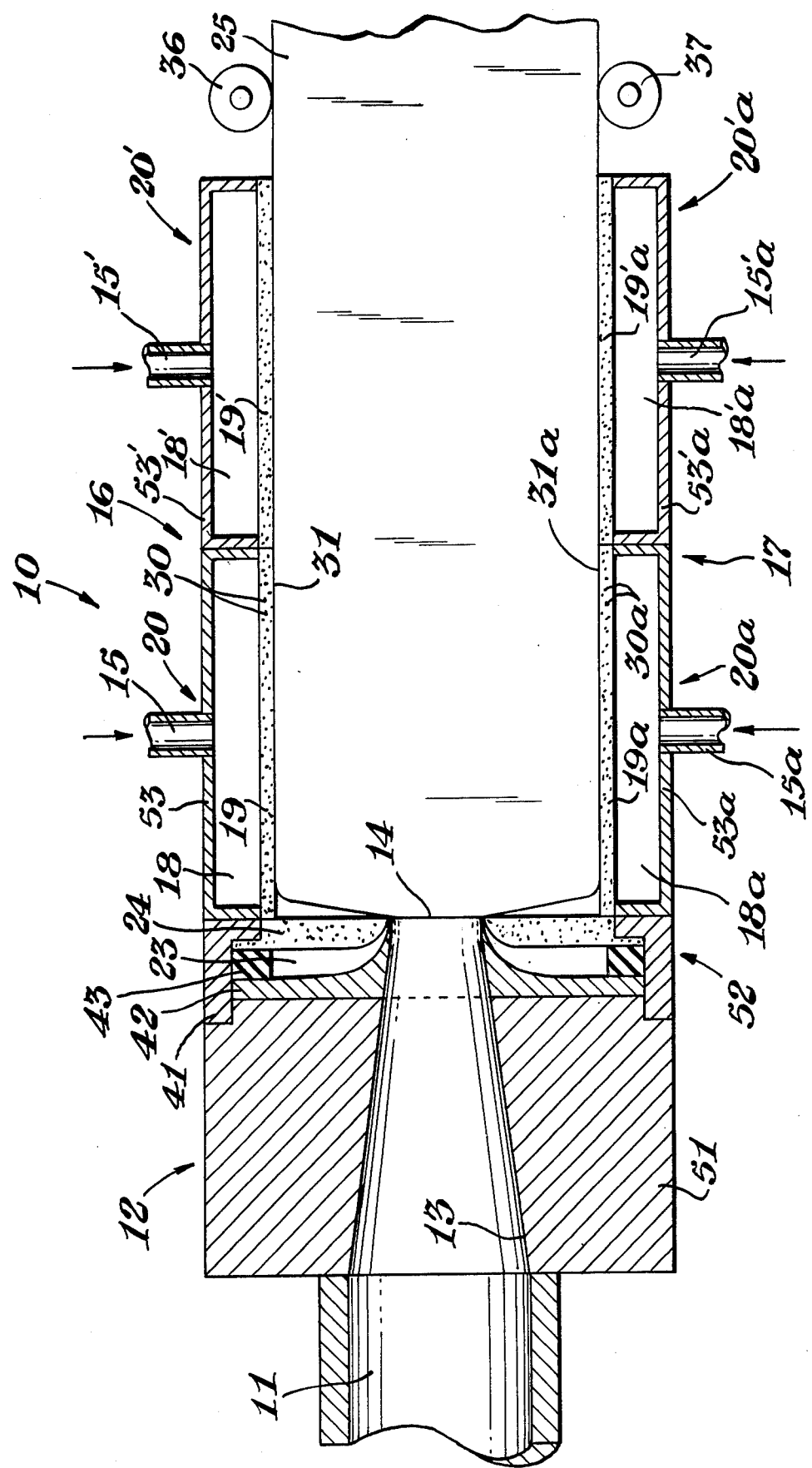
FIG. 1 is a sectional side view of an apparatus in accordance with the present invention.

The method and apparatus of the present invention can advantageously be employed using any extrudable, foamable composition of synthetic resinous material. Preferably, the resinous material is a normally solid, thermoplastic polymer.

Exemplary preferred polymers include the organic addition polymers of the following monomers: Aliphatic α-monoolefins such as ethylene, propylene, butene-1, and isobutene; vinyl halides such as vinyl chloride and vinylidene chloride; esters of α,β-ethylenically unsaturated carboxylic acid such as ethyl acrylate, methyl methacrylate and diethyl maleate; vinyl esters such as vinyl acetate; monovinylidene aromatic carbocyclic monomers such as styrene, α-methyl styrene, ar-chlorostyrene and ar-(t-butyl)-styrene; α,β-ethylenically unsaturated carboxylic acids such as acrylic acid, methacrylic acid, itaconic acid and fumaric acid. Also included are copolymers of the above-named monomers, such as ethylene/propylene copolymer, ethylene/vinyl acetate copolymer, ethylene/acrylic acid copolymer and the like. Also suitable are the cellulosic polymers such as methyl cellulose and ethyl cellulose, polyamides such as nylon, polyesters such as polyethylene terephthalate, polycarbonates and the like. Blends of the above-named polymers and copolymers are also included. Especially preferred thermoplastic polymers are polyethylenes, ethylene/vinyl acetate copolymers, ethylene/acrylic acid copolymers, ethylene/methacrylic acid copolymers, ionomer salts of such acid copolymers, polyvinyl chlorides, and polystyrenes.

Conventional blowing agents which are often used to foam thermoplastic polymers which are also suitable for use in this invention include gases and volatile liquids at ordinary temperatures and pressures such as the aliphatic or cycloaliphatic hydrocarbons boiling between about $-50°$ C. and $60°$ C., e.g., butane, pentanes and their mixtures with hexane, petroleum ether and mixtures thereof with hexane and cyclohexane; the halogenated hydrocarbon compounds, e.g., $CCl_3F$, $CCl_2F_2$, $CClF_3$, $CClF_2—CCl_2F$, $CClF_2—CClF_2$ and the like; mixtures of any two or more of the above and other conventional liquid and gaseous blowing agents. Also suitable are conventional chemical blowing agents such as dinitroso pentamethylene tetramine, p,p'-oxybis(benzene sulfonyl hydrazide), azodicarbonamide, and the like. Blowing agents are usually incorporated in amounts from about 0.05 to about 40 weight percent based on the polymer. Other ingredients such as fillers, anti-oxidants, nucleation agents and the like may also be present in the polymer gel.

Foamable compositions of the above-named polymers, blowing agents and additives are well known in the art and a representative sample of such compositions is set forth in the hereinbefore delineated patents, the teachings of which are herewith incorporated by reference thereto.

The present invention may be practiced by anyone ordinarily skilled in the art to extrude a thermoplastic foam having an enlarged cross-sectional area of any geometric configuration. As the geometric-configuration of a thermoplastic foam having an enlarged cross-sectional area changes, it will be necessary to make appropriate changes in the configuration of an extrusion orifice and the arrangement of forming members. Such changes are within the skill of one ordinarily skilled in the art.

The following description in connection with the drawing illustrates one embodiment of this invention which provides a thermoplastic foam having a cross-sectional area of generally rectangular geometric configuration but is not to be construed as limiting the scope of the invention.

Figure 2:
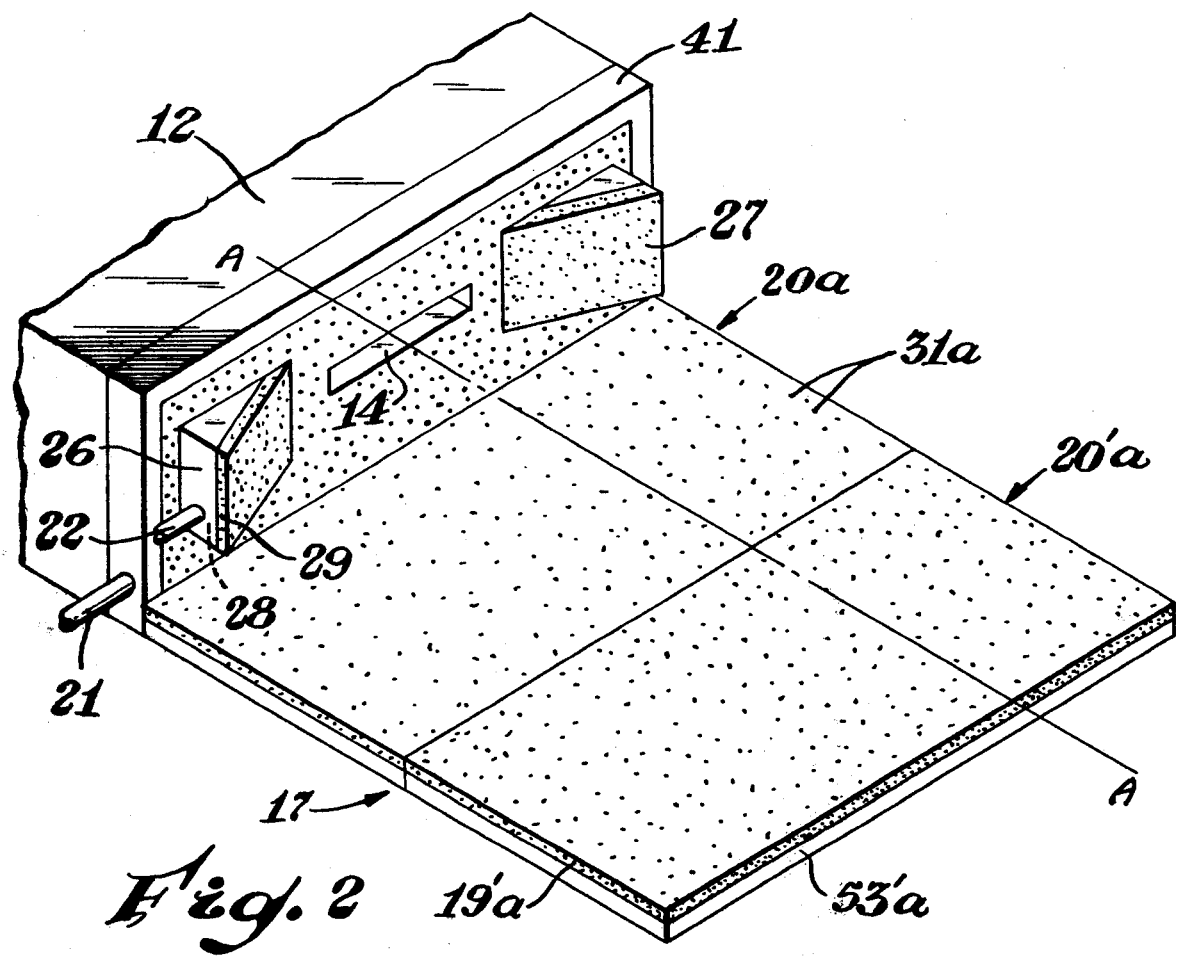
FIG. 2 is an isometric sketch of the apparatus having the top planar forming member and the extruder removed.
Figure 3:
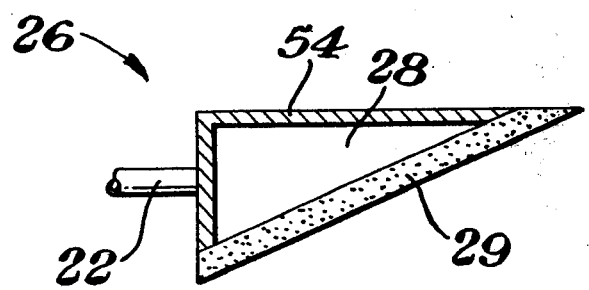
FIG. 3 is a sectional top view of one of the edge restraining means depicted in FIG. 2.

In FIGS. 1, 2 and 3 there is schematically depicted apparatus in accordance with the present invention generally designated by the reference numeral 10. The apparatus 10 comprises in cooperative combination a source 11 of heat-plastified foamable gel of thermoplastic polymer or an extruder. The extruder 11 has affixed thereto a die 12. The die 12 comprises in operative combination a die block 51 and a die face assembly 52. The die 12 has defined therein a passageway 13 in operative communication with the extruder 11. Remote from the extruder 11 the passageway 13 terminates in orifice 14. The extrusion orifice 14 has an elongate configuration having first and second major parallel sides, first and second parallel ends, a major axis, a minor axis and an axis of extrusion AA. A first forming member 16 is affixed to the die 12 adjacent to the orifice 14. The second similar forming member 17 is also affixed to the die 12 in generally parallel relationship to the forming member 16. The forming members 16 and 17 have a generally plate-like configuration and are affixed to the die 12 in such a manner that the orifice 14 is generally centrally disposed therebetween.

The forming member 16 is made of one or a plurality of slab-like sections 20 comprising a shell 53 and a plate-like porous material 19. The shell 53 is in peripheral sealing engagement with the porous material 19 and defines a plenum 18 therebetween. A conduit 15 is in operative communication with the plenum 18, a gas pressure regulating valve (not shown) and a pressurized gas source (not shown). The porous material 19 has a plurality of small pores 30 in operative communication with the plenum 18 and the conduit 15. The pores 30 have openings 31 on the inner surface of the forming member 16 remotely disposed from the conduit 15. A plurality of conduits 15 may be connected to a common gas regulating valve and a pressurized gas soruce. However, each conduit 15 may beneficially have a separate gas pressure regulating valve and a pressurized gas source, which gas may be heated or cooled to above or below ambient temperature before being introduced into the plenum 18. Other slab-like sections of the forming member 16 are of essentially identical construction to the slab-like section 20 and the corresponding portions are indicated by like reference numerals having a prime superscript. The forming member 17 is of essentially identical construction to the forming member 16 and the corresponding portions are indicated by like reference numerals having the suffix "a". An extruded thermoplastic foam product 25 becomes disposed between the forming members 16 and 17 and has a generally rectangular configuration. An edge restraining means 26, as shown in FIG. 2, is disposed generally adjacent to one end of the die and between the forming members 16 and 17. The edge restraining means 26 comprises a shell 54 and a plate-like porous material 29. The shell 54 is in peripheral sealing engagement with the porous material 29 and defines a plenum 28 therebetween. Another edge restraining means 27 is disposed generally adjacent to the other end of the die 12. The edge restraining means, however, can be positioned anywhere along the major axis of the die opening and can also partially close the opening. The two edge restraining means are generally symmetrical about the plane of the minor axis of the extrusion orifice 14 and axis of extrusion. The surfaces of the restraining means 26 and 27 which would come in contact with the gel emerging from the orifice 14 are made of the plate-like porous material 29, as shown in FIGS. 2 and 3. The porous material 29 has a plurality of small pores in operative communication with the plenum 28 and a conduit 22, which in turn communicates with a gas pressure regulating valve and pressurized gas source (not shown). The thickness of the restraining means 26 and 27 can be as great as the distance between the forming members 16 and 17. The surface of the die 12 which would come in contact with the gel emerging from the orifice 14 is also made of plate-like porous material 24, as shown in FIG. 1. The plate-like porous material 24 is a part of the die face assembly 52 and lies in a plane generally normal to the axis of extrusion AA. The die assembly 52 comprises a backing plate 42, the porous material 24 and a retaining flange 41. The backing plate 42 is attached to the die block 51 on the side opposite to which the source 11 is attached. A resilient gasket 43 is positioned between the backing plate 42 and the porous material 24. The gasket 43, the backing plate 42 and the porous material 24 define a plenum 23, as shown in FIG. 1. The backing plate 42 and the porous material have a knife-edge configuration near the extrusion orifice 14 convergent toward the direction of extrusion. The surface of porous material 24 remote from the plenum 23 is generally coplanar with the die orifice 14. The porous material 24 has a plurality of small pores in operative communication with the plenum 23 and a conduit 21, which in turn communicates with a gas pressure regulating valve and pressurized gas source (not shown). The gasket 42 and the retaining flange 41 are used to seal the edges of plenum 23 and porous material 24, respectively, which edges are located remote from the extrusion orifice 14.

The gas cushion can be formed by passing a gas stream through a plurality of pores located on the surfaces of the apparatus which would come in contact with the foam article being prepared. The pores can advantageously be introduced to the contact surfaces using a porous material, such as, for example, porous ceramic, glass or metal. When a solid material is used to fabricate parts of the apparatus, the pores can be introduced to the contact surfaces by drilling a number of small holes or by cutting a plurality of narrow slits thereon.

In another embodiment of this invention, each forming member 16 or 17 comprises a first portion in the form of a fixed plate mounted to the die and a second portion, remote from the orifice of the die, in the form of a movable plate pivotally mounted to the first portion thereof. Each portion is made of a plurality of slab-like section 20, as shown in FIGS. 1 and 2, and has a plurality of small pores 30 capable of forming a gas cushion thereon. The second portion of the forming member is attached to a suitable positioning means (not shown) such as a hydraulic cylinder screw or like adjusting means which provides limited angular adjustments of the second portion relative to the first portion about a hinge located therebetween.

In yet another embodiment, at least a part of the surfaces of the apparatus of this invention which comes in contact with the foam article being prepared is covered with polytetrafluoroethylene or other friction controlling materials.

In a further embodiment of this invention, a restraining means, such as, for example, one or more pairs of braking rollers 36 and 37 as shown in FIG. 1, is positioned outside of the forming members 16 and 17.

In practice of the process for the preparation of a thermoplastic foam having an enlarged cross-sectional area of generally rectangular configuration, in a continuous manner, wherein the foam passes through from a heated sticky state to cooled non-sticky state during the preparation, a heat-plastified foamable gel of a thermoplastic polymer and a blowing agent is extruded through the extrusion orifice 14 into the region defined by the forming members 16 and 17 and edge restraining means 26 and 27. As the gel begins to expand, it is generally supported on a cushion of gas supplied through the plurality of pores on the inner surfaces of the forming members 16 and 17, the pores on the restraining means 26 and 27 and the pores of the die 12. The gaseous cushion lubricates the contact surfaces of the apparatus and thereby prevents sticking of the foam thereto. As the foam moves away from the orifice of the die in the longitudinal direction, the foam begins to cool. When the surfaces of the foam cool to a generally non-sticky state, a restraining force is applied to the foam, for example, by increasing the friction between the foam and the contact surfaces of the forming members remote from the orifice of the die. Such restraining force exerts a force on the foam in the direction opposite to the normal longitudinal advancement thereof and forces the foam in the space generally between the die orifice and the area where the restraining force is applied to expand to a cross-sectional area significantly greater than that of a foam allowed to expand freely, i.e., free foaming.

The friction between the surfaces of the foam and the forming members can be increased using a variety of well known techniques, such as, for example, by controlling the temperature and/or pressure of the gas cushion or by controlling the spacing between the forming members, remote from the orifice of the die. The friction can also be increased by removing the gas cushion in the area of the forming members, remote from the die, where the foam is being restrained.

In another embodiment of the present invention, the cooled foam is restrained by a restraining means, such as, for example, one or more pairs of braking rollers 36 and 37 positioned outside of the forming members 16 and 17. Such restraining exerts a force on the foam in the direction opposite to the normal longitudinal advancement thereof and forces the foam within the forming members to expand to a cross-sectional area significantly greater than that of a foam allowed to expand freely, i.e., free foaming.

In the embodiment shown in the drawing, the enlarged foam is shaped into a generally rectangular configuration with the aid of the forming members 16 and 17 and the edge restraining means 26 and 27. Each of the edge restraining means 26 and 27 shown in FIGS. 2 and 3 resembles a triangular wedge having two adjacent, rectangular faces generally perpendicular to each other. One of the faces engages with the die 12. The other face optionally engages with a position adjusting member, not shown. The other rectangular face, positioned generally divergent away from the center of the extrusion orifice 14 toward the ends of the die 12, engages the foam during its expansion to provide the same with a generally rectangular cross-sectional area. The major foam-engaging, rectangular face may advantageously be curved. A preferred configuration of curved edge restraining means is disclosed in U.S. Pat. No. 3,966,381. A specific example of the edge restraining means shown in FIGS. 2 and 3 is intended to illustrate a feature of the present invention but not to be construed as limiting its scope. When the edge restraining means are not in use, the foam has an oblong cross-sectional area. The restraining means are provided with a cushion of gas to prevent sticking of the foam to the contact surfaces thereof.

Forming variables such as the pressure and temperature of the gaseous cushion and the separation of the forming members and the like need carefully be controlled to practice this invention. A precise control of each variable will vary depending on the composition of thermoplastic polymer gel used. However, control of such variables to practice this invention is within the skill of one ordinarily skilled in the art. For instance, it will be apparent to one skilled in the art that if the pressure of gas cushion is too low, the foam will stick to the contact surface of the apparatus, and the skin of the foam will tear. If the pressure is too high, the foam either buckles or the skin thereof cracks due to excessive cooling. The skin of the foam can also crack due to excessive cooling if the gas temperature is too low. In the other extreme, if the gas temperature is too high, the foam collapses.

The specific working examples that follow are intended to illustrate the invention but not to be construed as limiting its scope. In the examples, parts and percentages are by weight unless otherwise specified or required by the context.

EXAMPLES

Ethylenic polymer foams are made by continuous extrusion from a conventional screw-type extruder. The extruder comprises the usual sequential zones usually denominated feed zone, compression and melt zone, metering zone, and mixing zone. The barrel is provided with conventional electric heaters for zoned temperature control and with usual instrumentation. An inlet opening for fluid blowing agents under pressure and feed rate control is provided in the extruder barrel. This discharge end of the mixing zone of the extruder is connected, through a cooler providing a cooling and temperature control zone, to a die orifice having generally rectangular configuration. The die is connected to the forming members comprising a first portion in the form of a fixed plate mounted to the die and a second portion, remote from the die, in the form of a movable plate pivotally mounted to the first portion thereof.

In the examples described below, a low density polyethylene, having standard Melt Index 2.0 dg/min, in the form of common granules is fed through the feed hopper to the extruder. Talc as foam nucleation agent is fed to the hopper at a concentration of approximately 0.7 pph of polyethylene. The blowing agent comprises 1,2-dichlorotetrafluoroethane fed to the inlet at a concentration of approximately 20 pph of polyethylene. The temperature in the metering zone is maintained at about 180° C. The mixed mass of molten polymer and blowing agent from the mixing zone is cooled to the temperature of about 100° C., before passing through the die orifice. The mass emerging from the die orifice to atmospheric pressure expands and forms a cellular foam which is continuously shaped and enlarged using the edge shaping means and forming members comprising fixed and movable plates. The fixed plate is made of a plurality of slab-like sections, described hereinbefore, and has air cushions thereon formed by passing pressurized air through a plurality of pores on the contact surface thereof. The movable plate has no air cushions but the contact surfaces thereof are covered with polytetrafluoroethylene. In Example 1, the entire length of the movable plate is cooled with a water/ethylene glycol mixture maintained at a temperature of −7° C. and circulated through aluminum cooling tubes attached to the plate. The mass then cools and hardens to a board of cellular, flexible foam having an enlarged cross-sectional area and a generally rectangular cross-sectional configuration. Operating conditions for the forming members used in the examples are described in Table I.

Polyethylene foams of Examples 1 and 2 are made using the following start-up procedure: the fixed plates are mounted to the die with a predetermined distance therebetween; air cushions are activated on the fixed plates, edge restraining means and die face by passing pressurized air through the pores thereon; the foam is retrained by narrowing the gap between the movable plates, causing the foam to enlarge its cross-sectional area and fill the space between the fixed plates; and the air pressure and the distance between the movable plates are further adjusted.

Physical properties of polyethylene foams made in accordance with the teachings of the present invention and aged for 30 days are reported in Table II. For purposes of comparison physical properties of polyethylene foams made without an aid of forming members are also reported in Table II.

Polyethylene foams of comparative examples are made using the same starting raw materials and under the identical processing conditions as the corresponding example of the present invention. However, the foamable gel of comparative examples is extruded through the orifice of the die and is allowed to expand freely, i.e., without an aid of the forming members of the present invention.

TABLE I

| OPERATING CONDITIONS | Example 1 | Example 2 |
|---|---|---|
| Length of air cushioned fixed forming members (inches) made from ⅜ in thick Tegraglas®* Grade 40 Porous Ceramic | 3 | 3 |
| Forming member air cushion temperature (° C.) | 100 | Ambient |
| Length of hinged forming members (inches) | 7 | 18 |
| Angle of edge shaping means with die face (degrees) | 55 | 55 |
| Thickness of air cushioned shaping means (inches) | 1 | 1 |
| Die face air cushion temperature (° C.) | 100 | Ambient |
| Die opening (inches) | .15 × 2.25 | .19 × 3.0 |
| Forming member separation (inches) | 3 | 3 |

*Tegraglas® — a registered trademark of 3M Co.

TABLE II

| | FOAM PROPERTIES AFTER 30 DAYS | | | | | |
|---|---|---|---|---|---|---|
| | Example 1 | | | Example 2 | | |
| | Not Formed[1] | Formed | % Change[2] | Not Formed[1] | Formed | % Change[2] |
| Cell Size (mm) | | | | | | |
| Extrusion | 1.46 | .86 | −42.0 | 1.63 | 1.16 | −28.8 |
| Horizontal | 1.26 | 2.37 | 88.0 | 1.48 | 1.63 | 10.1 |
| Vertical | 1.92 | 2.17 | 13.0 | 1.81 | 1.81 | 10.0 |
| Density (pcf) | 2.5 | 2.7 | 5.9 | 3.2 | 2.6 | −16.8 |
| Compressive Strength (psi) | | | | | | |
| Extrusion | 11.6 | 5.2 | −55.0 | 10.5 | 5.1 | −51.3 |
| Tranverse | 6.3 | 7.8 | 23.8 | 6.1 | 6.3 | 3.8 |
| Vertical | 9.7 | 11.3 | 16.5 | 8.4 | 12.0 | 42.9 |
| Cross-Sectional Area (cm²) | 46 | 139 | 203 | 70 | 173 | 147 |

Notes:
[1] Not examples of this invention.
[2] % Change = [(Formed - Not Formed)/Not Formed] × 100.

As shown in Examples 1 and 2, use of forming members results in foams having enlarged cross-sectional areas as compared to the foams allowed to expand freely: Example 1 shows an increase in the cross-sectional area of 203 percent; Example 2, 147 percent. It is also possible to control the distribution of the directional compressive strength of the foams.

In place of the particular low density polyethylene used in the preceding examples, there can be used other thermoplastic polymers such as, for example, polystyrene, ethylene/vinyl acetate copolymer and the like, as hereinbefore described with substantially similar results in obtaining relatively thick, thermoplastic foams having enlarged and generally rectangular cross-sectional configurations.

While certain representative embodiments have been shown in detail for the purpose of illustrating the invention, it will be apparent to those skilled in the art that various changes and modifications can be made without departing from the spirit and scope of the invention.

What is claimed is:

1. In a method for the preparation of a thermoplastic foam plank having a cross-sectional area of a given geometric configuration, in a continuous manner, wherein the foam passes through from a heated sticky state to cooled non-sticky state during the preparation, the steps of the method comprising preparing a heat-plastified foamable gel, extruding the gel through an orifice of a die into a shaping channel of lower pressure at least partially defined by at least one forming member, the channel having an internal cross-sectional configuration generally corresponding to the shape of the foam desired, the foamable gel expanding into a foam generally filling the channel and advancing in the longitudinal direction toward the discharge end remote from the orifice of the die, and cooling the foam to a generally self-supporting condition, the improvement which comprises supporting the gel on a cushion of gas formed by introducing a gas stream between the surface of the gel and the opposing surface of the forming member, at least in the area of the channel, relatively near the orifice of the die, where the surface of the foam is sticky, and applying a sufficient restraining force to the foam in the area, relatively remote from the die orifice, where the foam surface is generally non-sticky, to exert a force in the direction opposite to the normal longitudinal advancement of the foam thereby forcing the foam in the space generally between the orifice of the die and the area where the restraining force is applied to expand to a cross-sectional area greater than that of a foam allowed to expand freely.

2. The method of claim 1 wherein at least a portion of the gas cushion is heated or cooled to a temperature above or below the ambient temperature.

3. The method of claim 1 wherein the face of the die containing the orifice is provided with a cushion of gas thereby preventing sticking of the extruded gel to the die face.

4. The method of claim 1 wherein the restraining force is applied to the foam by increasing the frictional force between the foam surface and the surfaces of the forming members.

5. The method of claim 1 wherein the restraining force is applied to the foam by reducing the cross-sectional area of the channel, remote from the orifice of the die.

6. The method of claim 1 wherein the restraining force is applied to the foam outside of the channel, remote from the orifice of the die.

7. The method of claim 1 wherein the thermoplastic resin is selected from the group consisting of normally solid polymers of ethylene, propylene, butene-1, isobutene, vinyl chloride, vinylidene chloride, ethyl acrylate, methyl methacrylate, styrene, α-methyl-styrene, ar-(t-butyl) styrene, ethyl cellulose, methyl cellulose, ethylene/vinyl acetate copolymer, ethylene/acrylic acid copolymer, ethylene/methyl methacrylate acid copolymer, ionomer salt of such acid copolymers, and blends thereof.

8. The method of claim 1 wherein the gas cushion is formed by passing a gas through a plurality of pores located on the surfaces of the forming members.

9. In a method for the preparation of a thermoplastic foam plank having a cross-sectional area of a generally rectangular geometric configuration, in a continuous manner, wherein the foam passes through from a heated sticky state to cooled non-sticky state during the preparation, the steps of the method comprising preparing a heat-plastified foamable gel, extruding the gel through an elongate orifice of a die, which orifice has a major axis and a minor axis, into a channel of lower pressure defined by a pair of spaced apart, generally parallel, planar forming members, lying generally parallel to and one on each side of a plane defined by the major axis of the orifice and the axis of extrusion and a pair of edge restraining means positioned generally adjacent to ends of the orifice of the die, the foamable gel expanding into a foam generally filling the channel and advancing in the longitudinal direction toward the discharge end remote from the orifice of the die, and cooling the foam to a generally self-supporting condition, the improvement which comprises supporting the gel on a cushion of gas, formed by introducing a gas stream between the surface of the gel and the opposing surfaces of the forming members and those of the restraining means, at least in the area of the channel, relatively near the orifice of the die, where the surface of the foam is sticky, and applying a sufficient restraining force to the foam in the area, relatively remote from the die orifice, where the foam surface is generally non-sticky, to exert a force in the direction opposite to the normal longitudinal advancement of the foam thereby forcing the foam in the space generally between the orifice of the die and the area where the restraining force is applied to expand to a cross-sectional area greater than that of a foam allowed to expand freely.

10. The method of claim 9 wherein the face of the die lying in the plane generally defined by the major axis and the minor axis of the die orifice is provided with a cushion of gas thereby preventing sticking of the extruded gel to the die face.

11. The method of claim 10 wherein the gas cushion is formed by passing a gas through a plurality of pores located on the surfaces of forming members, edge restraining means and die face.

12. In an apparatus for the preparation of a thermoplastic foam plank by extrusion which comprises in cooperative combination a source of heat-plastified foamable gel of a thermoplastic resin containing a blowing agent, said source having a source discharge end, a die having a receiving end, a die discharge end, a passageway between said die ends terminating in an extrusion orifice at said die discharge end, said orifice having an axis of extrusion, said receiving end of said die being in operative combination with said discharge end of said source, a supporting and shaping means having a first end and a second end, said first end in operative combination with said die, said first end adapted to receive foamable gel from said extrusion orifice, said supporting and shaping means adapted to receive foamable gel from said extrusion orifice thereby shaping at least a major portion of the cross-sectional configuration of a thermoplastic foam article being prepared, the improvement wherein said supporting and shaping means comprises at least one forming member defining at least one plenum therein, a gas supply means defining a gas supply passage, said gas supply passage in operative communication with said plenum, said forming member having at least one wall portion, said wall portion defining generally opposed shaping surface portions disposed on opposite sides of the axis of extrusion, said wall portion having a generally porous region of generally uniform porosity at least at a location adjacent to said die, said forming member in said porous region defining passage means for a gas between said plenum and the foam article being prepared, said surface portions defining a space therebetween and said space bounded by said surface portions, said surface portions being disposed at least about a major portion of the perimeter of the cross-sectional configuration of said space, the cross-sectional configuration of said space being in a plane which is generally perpendicular to the axis of extrusion.

13. The improvement according to claim 12 wherein the wall portion is made of a porous material.

14. The improvement according to claim 12 wherein at least a part of the shaping surface portions is covered with polytetrafluoroethylene.

15. The improvement according to claim 12 wherein said die contains at least one die plenum therein, a die gas supply means defining a die gas supply passage, said die gas supply passage in operative communication with said die plenum, said die having a die surface portion surrounding said extrusion orifice, said die surface portion having a generally porous region of uniform porosity at least at an area adjacent to said extrusion orifice, and said porous region defining passage means for a gas between said die plenum and the foam being prepared.

16. The improvement according to claim 13 wherein the porous material is porous metal.

17. The improvement according to claim 13 wherein the porous material is porous glass.

18. In an apparatus for the preparation of a thermoplastic foam plank by extrusion which comprises in cooperative combination a source of heat-plastified foamable gel of a thermoplastic resin containing a blowing agent, said source having a source discharge end, a die having a receiving end, a die discharge end, a passageway between said die ends terminating in an extrusion orifice at said die discharge end, said orifice having ends, an axis of extrusion and a major axis and a minor axis in a plane normal to the axis of extrusion, said receiving end of said die being in operative combination with said discharge end of said source, a supporting and shaping means having a first end and a second end, said first end in operative combination with said die, said first end adapted to receive foamable gel from said extrusion orifice, said supporting and shaping means adapted to receive foamable gel from said extrusion orifice thereby shaping at least a major portion of the cross-sectional configuration of a thermoplastic foam article being prepared, the improvement wherein said supporting and shaping means comprises a pair of spaced apart, generally parallel planar forming members, lying generally parallel to and on each side of a plane containing the major axis of the orifice and the axis of extrusion, each planar forming member defining at least one plenum therein and provided with a gas supply means defining a gas supply passage, said gas supply passage in operative communication with said plenum, each said forming member having at least one wall portion, said wall portions of said planar forming members defining generally opposed shaping surface portions disposed generally parallel to and on each side of said extrusion axis containing plane, said wall portions having a generally porous region of generally uniform porosity at least at a location adjacent to said die, said wall portion in said porous region defining passage means for a gas between said plenum and the foam article being prepared, said surface portions defining a space therebetween and said space bounded by said surface portions, said surface portions being disposed at least about a major portion of the perimeter of the cross-sectional configuration of said space, the cross-sectional configuration of said space being in a plane which is generally perpendicular to the axis of extrusion, and a pair of edge restraining means positioned generally adjacent to ends of the extrusion orifice and between the planar forming members, said edge restraining means having at least one edge wall portion, said edge wall portion being generally perpendicular to said planar forming members and divergent away from the extrusion orifice, said edge wall portion having a generally porous region of uniform porosity, said edge wall portion positioned adjacent to at least one edge plenum contained within said edge restraining means, said edge restraining means defining an edge gas supply passage, said edge gas supply passage in operative communication with said edge plenum, and said porous region defining passage means for a gas between said edge plenum and the foam article being prepared.

19. The improvement according to claim 18 wherein each planar forming member has a first portion fixedly mounted to the die and a second portion pivotally mounted to said first portion thereof.

* * * * *